United States Patent [19]

Litman

[11] 4,104,614
[45] Aug. 1, 1978

[54] WARNING LIGHT FOR EMERGENCY VEHICLES

[75] Inventor: Alan Litman, Pittsburgh, Pa.

[73] Assignee: Smith & Wesson Chemical Company, Inc., Pittsburgh, Pa.

[21] Appl. No.: 665,357

[22] Filed: Mar. 10, 1976

[51] Int. Cl.² .............................................. B60Q 1/46
[52] U.S. Cl. ..................... 340/81 R; 340/87;
340/84; 340/50; 350/97; 350/99; 350/100;
350/101; 350/288; 362/170; 362/35; 362/255
[58] Field of Search ................. 340/81 R, 87, 84, 50,
340/98; 350/97, 99, 100, 101, 107, 288, 289,
285, 7; 240/44.2, 41.35 R, 41.35 C, 41.5, 44,
44.1, 24, 49, 61.7, 61.6, 103 A; 362/170, 35, 255

[56] References Cited

U.S. PATENT DOCUMENTS

| | | | |
|---|---|---|---|
| 1,684,795 | 9/1928 | Gnudi | 240/41.35 C |
| 2,475,365 | 7/1949 | Walsh | 340/50 |
| 2,719,282 | 9/1955 | Roth | 340/50 |
| 2,740,103 | 3/1956 | Gosswiller | 340/50 |
| 2,928,072 | 3/1960 | Arnold, Jr. | 340/50 |
| 3,133,263 | 5/1964 | Norberg | 340/50 |

*Primary Examiner*—John W. Caldwell, Sr.
*Assistant Examiner*—Donnie L. Crosland

[57] ABSTRACT

A warning light for emergency vehicles for which light sources project parallel light beams along predetermined paths with a rotatable reflector having opposite reflective surfaces for directing the parallel light beams to the front and alternately to the rear of the vehicle, and a stationary reflector for periodically directing at least one of the light beams in a predetermined direction.

22 Claims, 4 Drawing Figures

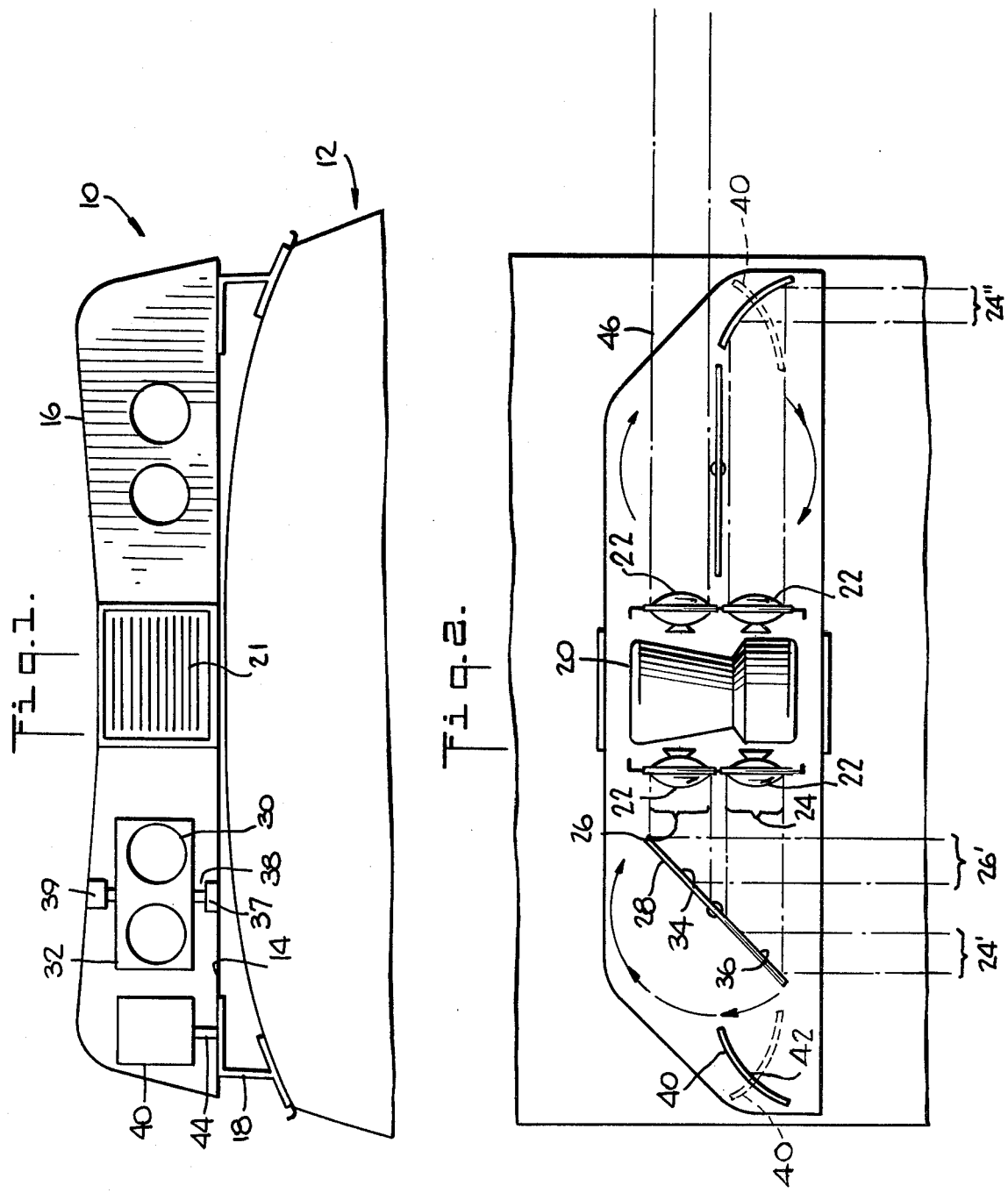

WARNING LIGHT FOR EMERGENCY VEHICLES

The present invention relates to a warning light for emergency vehicles and particularly relates to a warning light system providing flashing lights and points of illumination visible from the front, rear, and sides of the vehicle as well as high intensity narrow dispersion flashing points of illumination for long range visibility.

Many and various types of warning lights for emergency vehicles have been proposed and constructed in the past. One of the most common lights of this type is comprised of a bulb having a parabolic reflector mounted for rotation about the bulb whereby a flashing or blinking effect is provided. An example of this type of warning light is disclosed in U.S. Pat. No. 2,814,029. Another example of a warning light for emergency vehicles is disclosed in U.S. Pat. No. 3,404,371 in which a pair of oppositely directed light sources on each side of a light bar alternately project their beams against a parabolic reflector to provide flashing lights of increased intensity to one side of the light bar. Strobe lights have also been utilized as warning lights in emergency vehicles. Various disadvantages, however, are associated with these and other known warning lights for emergency vehicles. For example, when rotating light sources are utilized, electrical brushes and elaborate mountings are required. These installations are thus expensive to manufacture and subject to wear necessitating periodic maintenance and replacement. With respect to strobe lights, significant electronic circuitry is required thus increasing the cost and expense of utilizing strobe lights in emergency vehicles. Furthermore, the foregoing and other warning lights for emergency vehicles. known to applicant generally do not provide optimum visibility for example, both long and short range warning. That is, many such prior devices are arranged to provide flashing lights of only adequate intensity and/or high dispersion whereby only limited range warning is provided. Visible warning at extreme distances is a desirable feature of a safe adequate warning system but can be very often annoying at close distances when utilized in a warning light of the type herein considered.

The present invention provides a warning light for emergency vehicles which minimizes and/or eliminates many of the foregoing and other problems associated with prior warning lights for emergency vehicles and provides a novel and improved warning light for emergency vehicles having various advantages in construction, operation and result in comparison with such prior warning lights. Particularly, the present invention provides a warning light for emergency vehicles characterized by the provision of both long and short range flashing points of illumination all emanating from like light sources. That is, in accordance with the present invention a plurality of blinking or flashing points of illumination are provided having the intensity and angular dispersion necessary to provide adequate warning and visibility at relatively short ranges. Conjunctively, the warning light hereof also provides long range, directionally controlled, flashing points of illumination to provide early visible warning at extreme distances. A feature of the present invention resides in the provision of three blinking points of illumination from each set of two light sources as amplified below. Particularly, the present invention provides a light bar for mounting on the roof of an emergency vehicle. The light bar includes a pair of sealed beam light sources on each side of the center line of the light bar and arranged to project a pair of parallel light beams laterally outwardly from the corresponding side of the vehicle. On each side of the light bar and in the path of the parallel directed light beams is provided a planar reflector having a pair of reflecting surfaces on each of its opposite sides. Each reflector is mounted on the light bar for rotation about a vertical axis. Upon rotation of the planar reflectors, a pair of flashing points of illumination are alternately visible from the front and rear sides of the vehicle and from each side of the light bar.

Further, the axis of rotation of each reflector lies between the parallel light beams emanating from the side-by-side light sources. Consequently, during the rotary excursion of each reflector, it will obtain a position parallel to and between the parallel light beams emanating from the light sources whereby both light beams will pass the reflector. To provide a high intensity flashing point of illumination for long range visibility on each side of the light bar, a reflector is mounted on the outboard portion of the light bar at each of its opposite ends and in the path of one of the light beams emanating from the two light sources on the corresponding side of the vehicle. Each reflector is arranged to reflect the light beam in a direction parallel to the direction of movement of the vehicle. It will be appreciated that the rotating reflector interposed between the fixed reflector and the light source on each side of the light bar creates an on/off or shuttering effect with respect to the light beams reflected from the concave reflectors. This shuttering effect provides a blinking or flashing point of illumination on each side of the light bar visible from either the front or rear of the vehicle depending upon the selected orientation of the reflector. Also, the outer reflectors provide in conjunction with this shuttering action flashing points of illumination in the selected direction of particularly high intensity and narrow dispersion thus providing a visible warning at extreme distances. Each outer reflector may have a planar or concave reflecting surface.

The high intensity of the outboard flashing points of illumination is believed a result of the abrupt increase and decrease in light intensity and the square waveform (with consequent long peak dwell) of the energy pulse of the light beams effected by rotation of the reflectors disposed between the outboard reflectors and the light sources, the rotating deflectors interacting with the outboard reflectors to create the on/off shuttering effect. The outboard deflectors may also be rotated or indexed such that the high intensity narrow dispersion light beams reflected from the light sources may be directed in either a forward or rearward direction relative to the vehicle which makes this warning light particularly useful at accident sites on high speed highways. It will also be appreciated that a single flashing light is visible from each side of the vehicle by the interaction of the rotary reflector with the other of the light beams emanating from the pair of light sources and not directed to the outboard reflector.

For each set of two light sources, the foregoing arrangement provides (a) two flashing points of intense illumination having angular dispersion comparable to that created by existing rotating beacons visible from the front and rear of the vehicle, (b) a flashing point of illumination providing a reflected light beam of high intensity and narrow dispersion visible selectively from the front or rear of the vehicle, and (c) a flashing light visible from the corresponding side of the vehicle. Consequently, when two sets of two light sources each are utilized, six flashing points of illumination are arrayed across the light bar and visible from either the front or rear of the vehicle depending upon the selected orientation of the outbard reflectors. Four flashing points of illumination are always visible from each of the front and rear sides of the light bar. Additionally, a flashing light is visible from both sides of the vehicle. Thus, a highly efficient warning light is provided visible from the front, rear and sides of the vehicle and which provides effective long as well as short range warning from a greater number of points of illumination than light sources.

Accordingly, it is a primary object of the present invention to provide a novel and improved warning light for emergency vehicles.

It is another object of the present invention to provide a novel and improved warning light for emergency vehicles characterized by discrete flashing points of illumination visible at both long and short ranges.

It is still another object of the present invention to provide a novel and improved warning light for emergency vehicles wherein optimum use of a predetermined number of available light sources is afforded by providing flashing points of illumination in greater numbers than the number of light sources.

It is a further object of the present invention to provide a warning light for emergency vehicles having increased efficiency at reduced cost.

It is a still further object of the present invention to provide a warning light for emergency vehicles comprised of three flashing points of illumination for each set of two light sources, one of the flashing points of illumination providing a high intensity narrow dispersion light beam visible at long range whereby the warning light is particularly adapted for use at accident sites on high speed roads.

These and further objects and advantages of the present invention will become more apparent upon reference to the following specification, appended claims and drawings wherein:

FIG. 1 is a front elevational view of a warning light for emergency vehicles constructed in accordance with the present invention;

FIG. 2 is a top plan view thereof;

Figure 3:
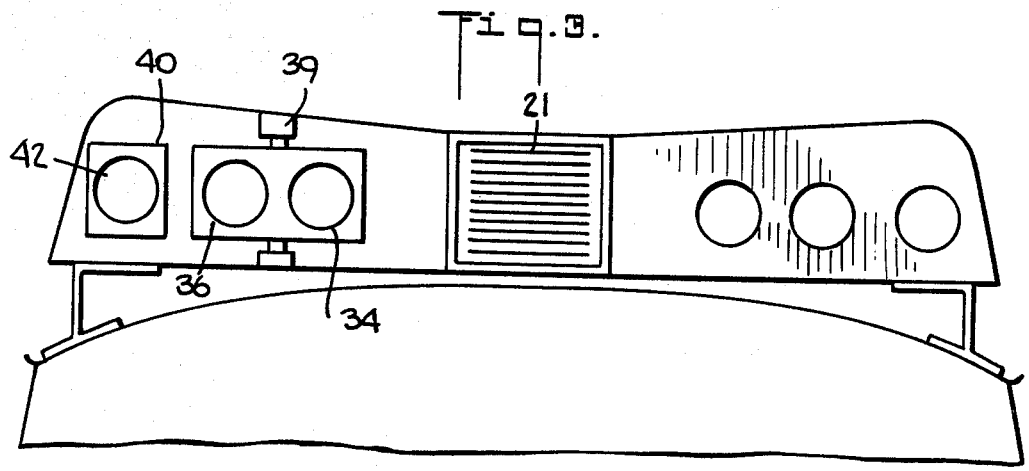
FIG. 3 is a rear elevational view thereof.
Figure 4:
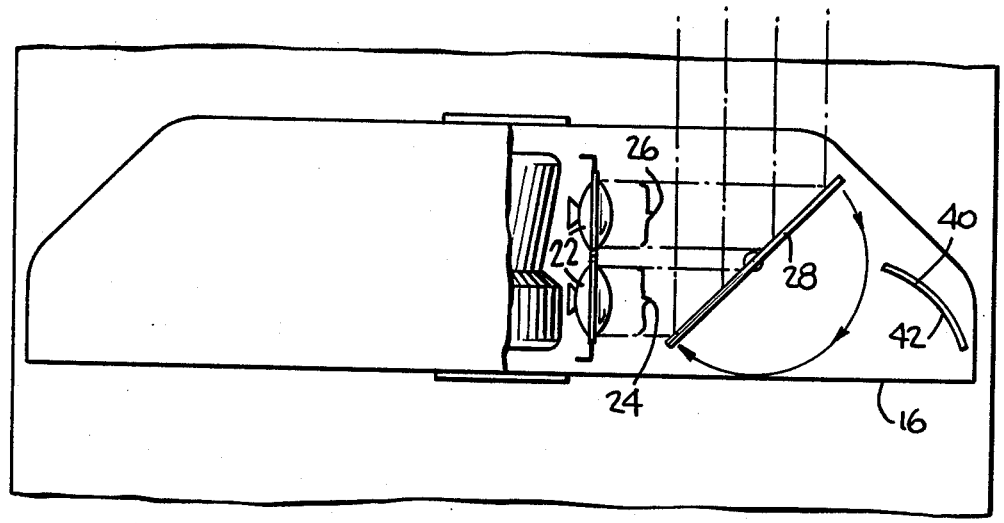
FIG. 4 is a fragmentary plan view of an outboard portion of the warning light.

Referring to the drawings, there is illustrated a light bar generally designated 10 for mounting on the roof of an emergency vehicle generally indicated 12. Light bar 10 comprises a housing having an opaque base 14 and a transparent cover 16. Light bar 10 is suitably secured to the roof of vehicle 12, for example by brackets designated 18 interconnecting base 14 and the vehicle roof. It will be appreciated that light bar 10 extends transversely of the vehicle, i.e., normal to the direction of vehicle travel. Mounted medially of light bar 16 is a conventional siren 20. Grills 21 are provided along front and rear sides of the light bar cover 16 directly in front of and behind the siren 20.

Within the light bar 10 and on each side of the siren 20 there is mounted a pair of sealed beam light sources 22. The pairs or sets of light sources 22 are positioned to project two parallel light beams 24 and 26 parallel to the long axis of the light bar and transversely to respective opposite sides of vehicle 12. Light bar 10 carries a planar reflector 28 on each side thereof and in the path of light beams 24 and 26. Each planar reflector 28 carries a pair of reflective surfaces 30 and 32 on one side and another pair of reflective surfaces 34 and 36 on its opposite side. Each reflector 28 is carried for rotation on a vertically disposed spindle 38 mounted in suitable bearings 39 at opposite ends of the spindle. Each spindle 38 thus defines a vertical axis about which its reflector 28 is rotated, the axis or spindle 38 being located between the pair of parallel light beams 24 and 26. A suitable drive mechanism, for example an electrical motor 37 coupled through gearing to the spindle 38, is provided wach reflector 28 whereby reflectors 28 are driven continuously in rotation.

It will be appreciated from a review particularly of FIG. 2 that reflectors 28, upon rotation thereof, provide four flashing points of illumination visible from both the front and rear sides of light bar 10, and hence from the front and rear of the vehicle. Particularly, when the left-hand deflector 28 of FIG. 2 obtains the rotary position illustrated, light beams 24 and 26 are reflected from surfaces 36 and 34 respectively such that the respective light beams 24' and 26' are respectively directed along parallel paths to the rear of the vehicle. Since reflector 28 is continuously rotating, reflected light beams 24' and 26' provide an on/off or flashing effect visible from the rear of the light bar 10. When the reflector 28 rotates, i.e., in the direction of the arrows, a distance of approximately 90 degrees, the light beams 24 and 26 are reflected by reflective surfaces 30 and 32 to provide a pair of forwardly reflected light beams which, due to the continuous rotation of deflector 28, appear as flashing points of illumination visible from the front of light bar 10. Consequently, four flashing points of illumination are visible from each of the front and rear sides of the light bar 10 by reflecting light from each set of light sources by the rotary reflector associated therewith.

To provide flashing points of illumination of high intensity and narrow dispersion, i.e., points of illumination visible at considerable distances from the vehicle, there is provided on each of the opposite sides of light bar 10 an outboard reflector 40 having a concave reflective surface 42. Each reflector 40 is disposed outboard of the reflector 28 on the corresponding side of the vehicle and in the path of the rearmost light beam 24. From a review of the right-hand side of FIG. 2, it will be appreciated that light beam 24 will impinge upon and be reflected from the reflective surface 42 of reflector 40 when the reflector 28 between reflector 40 and light source 22 obtains a position parallel to the light beams 24 and 26. It will also be appreciated that the continuous rotation of reflector 28 provides a shuttering or on/off effect on light beam 24 as it impinges on reflector 40 whereby the light beam 24" reflected from surface 42 will appear as a flashing point of illumination. The outboard reflectors 40 in conjunction with this shutter action provide a reflected flashing light beam 24" or point of illumination of very high intensity and narrow angular dispersion. It is believed that the high intensity of this flashing point of illumination, as produced by the shuttering effect, is a result of the abrupt change in contrast and the retinal saturation characteristics produced by the square waveform of the energey pulse effected by the rotating reflector 28 interacting with the curved reflective surface 42 of reflector 40. Instead of the sinusoidal waveform produced by beacons of known construction, it is believed that this shuttering action produces a square waveform with a consequent long peak dwell which appears as a high intensity flashing point of illumination visible from long range.

The outboard reflectors 40 are mounted on spindles 44. Spindles 44 may be rotated or indexed to selected angular positions. For example, spring biased detents can be provided to lock the reflectors 40 in selected angular positions. Manually operated handles or electrical drive means may be provided to index the outboard reflectors 40 into the various angular positions. It will be appreciated froma review of FIG. 2, that rotation of each of the reflectors 40 90° to the position shown in dash lines will provide for reflection of the light beams 24 in a forward direction rather than rearwardly as illustrated. It is to be understood further that the outboard reflectors may each have a planar reflecting surface or a concave reflecting surface as illustrated in the drawing.

It will also be appreciated from a review of the right-hand side of FIG. 2 that a flashing light is also visible from each side of the vehicle. This results from reflector 28 obtaining a rotary position parallel to light beams 24 and 26. As illustrated, the rear light source, when reflector 28 is positioned parallel to light beams 24 and 26, is reflected by reflector 40 either rearwardly or forwardly depending on the position of deflector 40. The other light beam, however, is not intercepted by reflector 28 and thus continues outwardly to one side of the vehicle as illustrated at 46. Reflector 28 also acts as a shutter with respect to this latter light beam to provide an on-/off or flashing effect.

Consequently, it will be appreciated that each reflector 28 cooperates with the corresponding pair of light sources and reflector 40 to substantially concurrently provide two flashing points of illumination visible from both the rear and front of the vehicle, a high intensity point of illumination visible over extended distances from either the front, rear and/or side of the vehicle, and a single flashing light visible from the side of the vehicle. The foregoing multiplicity of points of illumination on the light bar emanating, of course, from only two light sources. When two sets of the foregoing described reflectors 28 and 40 and light sources 22 are provided on opposite sides of the light bar, a warning light highly visible from all sides of the emergency vehicle is obtained and particularly from the front or rear of the vehicle depending upon the angular position of outboard reflectors 40.

The invention may be embodied in other specific forms without departing from the spirit or essential characteristics thereof. The present embodiment is therefore to be considered in all respects as illustrative and not restrictive, the scope of the invention being indicated by the appended claims rather than the foregoing discription, and all changes which come within the meaning and range of equivalency of the claims are therefore intended to be embraced therein.

What is claimed and desired to be secured by United States Letters Patent is:

1. Warning light apparatus for emergency vehicles comprising a light source carried by said apparatus for projecting a light beam along a predetermined path, a first reflector carried by said apparatus for rotation about a generally vertical axis and having a reflective surface, said reflective surface being disposed in the path of said light beam when said reflector lies in a first rotary position to reflect the light beam in a first direction, said reflector being movable to a second rotary position to position the reflective surface out of the path of said light beam, a second reflector carried by said apparatus and having a reflective surface, said second reflector being located in the path of said light beam a greater distance from said light source than said first reflector so that when said first reflector lies in said second rotary position the second reflector reflects said light beam in substantially a like direction as said first direction.

2. Apparatus according to claim 1 wherein the reflective surface of said first reflector is planar in shape.

3. Apparatus according to claim 1 wherein the reflective surface of said second reflector is planar in shape.

4. Apparatus according to claim 1 wherein the reflective surface of said first reflector is planar in shape and the reflective surface of said second reflector is concave in shape.

5. Apparatus according to claim 1 wherein the reflective surface of said first reflector is planar in shape, said first reflector having another planar reflective surface lying generally parallel to and facing in the opposite direction from said first reflective surface for reflecting said light beam in a direction substantially opposite said first direction upon rotary movement of said first reflector into a third rotary position different from said first and second rotary positions.

6. Apparatus according to claim 5 wherein the reflective surface of said second reflector is concave in shape.

7. Apparatus according to claim 1 wherein said second reflector is movable into a second position for reflecting the light beam, when said first reflector lies in its second position, in a direction substantially opposite said first direction.

8. Apparatus according to claim 1 including a second light source carried by said apparatus for projecting a light beam in a direction substantially parallel to said predetermined direction, said first reflector having a second reflective surface lying generally parallel to and facing in the same direction as the first mentioned reflective surface, said second reflective surface lying generally in the path of the light beam projected by said second light source to reflect the latter, when said first reflector lies in said first rotary position, in a direction generally parallel to said first direction.

9. Apparatus according to claim 8 wherein the axis of rotation of said first reflector lies generally between the light beams projected from said two light sources.

10. Apparatus according to claim 9 wherein the light beam projected from said second light source continues laterally outwardly of said warning light when said first reflector lies in said second rotary position.

11. Apparatus according to claim 8 wherein said first reflector has third and fourth reflective surfaces lying generally parallel to and facing the opposite direction from said first and second reflective surfaces for reflecting the light beams from said light sources in a direction substantially opposite said first direction upon rotary movement of said first reflector into a third rotary position different from said first and second rotary positions.

12. Warning light apparatus for emergency vehicles comprising a pair of light sources carred by said apparatus for projecting light beams in predetermined generally opposite paths, a first pair of reflectors carried by said apparatus for rotation about generally vertical axes, each of said first pair of reflectors having a reflective surface, said reflective surfaces being disposed in the respective paths of said light beams when said reflectors lie in respective first rotary positions to reflect the light beams in first, generally parallel directions, said reflectors being movable to second rotary positions to position the reflective surfaces out of the path of the respective light beams, a second pair of reflectors carried by said apparatus, each of said second pair of reflectors having a reflective surface, the reflective surface of one of said second pair of reflectors being located in the path of one of said light beams a greater distance from the light source than one of said rotary reflectors so that when said one of the first pair of reflectors lies in said second rotary position said one of the second pair of reflectors reflects said light beam in substantially the same direction as said first direction, the reflective surface of the other of said second pair of reflectors being located in the path of the other of said light beams a greater distance from said light source than the other of said rotary reflectors so that when said other of the first pair of reflectors lies in said second rotary position the other of the second pair of reflectors reflects said light beam in substantially the same direction as said first direction.

13. Apparatus according to claim 12 wherein said first pair of reflectors are carried for continuous rotary movement, each of the reflective surfaces of said second pair of reflectors being concave in shape, the rotation of said first pair of reflectors providing a shuttering action for the light beams impinging on said second pair of reflectors whereby the light beams reflected from said second pair of reflectors appear more intense than the light beams reflected from said first pair of reflectors.

14. Apparatus according to claim 13 wherein said second pair of reflectors are mounted for movement into a second position for reflecting the light beams from the light sources in a substantially opposite direction as said first direction when said second pair of reflectors lie in said position.

15. Warning light apparatus for emergency vehicles adapted to travel in a given direction said apparatus comprising an elongated light bar having an axis adapted for mounting on a vehicle with the light bar axis generally traverse to the direction of vehicle travel, a light source carried by said light bar for projecting a light beam in a path generally parallel to the axis of said light bar, a first reflector carried by said light bar for rotation about a generally vertical axis and carrying a reflective surface, means for rotating said first reflector, said reflective surface being located in the path of said light beam during a portion of its rotary movement to reflect the light beam to one side of the light bar and being located out of the path of the light beam during another portion of its rotary movement whereby, upon continued rotary movement of said first reflector, the light beams reflected from the reflected surface of said first reflector appear as flashing points of illumination visible from opposite sides of the light bar, a second reflector carried by said light bar and carrying a reflective surface, the reflective surface of said second reflector being located a greater distance from said light source than said first reflector and in the path of the light beam from said light source, said first reflector being movable into and out of the path of the light beam from said light source in the course of its rotary movement whereby the beams of light reflected from the reflective surface of said second reflector and to one side of the light bar appear as flashing points of illumination visible from said one side of said light bar.

16. Apparatus according to claim 15 wherein the reflective surface of said second reflector is convex in shape, the rotation of said first reflector providing a shuttering action for the light beam impinging on said second reflector whereby flashing points of illumination visible from said second reflector appear more highly intense in comparison with the flashing points of illumination visible from said first reflector.

17. Apparatus according to claim 15 including a second light source carried by said light bar for projecting a light beam in a direction parallel to the long axis of said light bar and in the same direction as the light beam from the first mentioned light source, said first reflector carrying a second reflective surface, said second reflective surface being located in the path of the second light beam during a portion of the rotary movement of said first reflector to reflect the second light beam to respective opposite sides of the light bar and being located out of the path of the second light beam during another portion of the rotary movement of said first reflector whereby, upon continued rotary movement of said first reflector, the light beams reflected from said second reflective surface appear as flashing points of illumination visible from opposite sides of the light bar.

18. Apparatus according to claim 17 wherein said second reflective surface is carried on the same side of said first reflector as the first mentioned reflective surface whereby the flashing points of illumination generated from said first and second reflective surfaces are both visible first from one side of said light bar and then from the opposite side of said light bar.

19. Apparatus according to claim 17 wherein said second reflective surface is carried on the opposite side of said first reflector from said first mentioned reflective surface whereby the flashing points of illumination generated from said first and second reflective surfaces are out of phase one with the other 20. Apparatus according to claim 17 wherein rotation of said first reflector provides a shuttering action for the second light beam whereby a flashing point of illumination is visible from the end of said light bar and from on side of the vehicle.

21. Warning light apparatus for emergency vehicles comprising a light source carried by said apparatus for projecting a light beam along a predetermined path, a first reflector carried by said apparatus for rotation about a generally vertical axis and having a reflective surface, said reflective surface being disposed in the path of said light beam when said reflector lies in the first rotary position to reflect the light beam in a first direction, said reflector being movable to a second rotary position to locate the reflective surface out of the path of said light beam, said first reflector having another planar reflective surface lying generally parallel to and facing in the opposite direction from said first reflective surface for reflecting said light beam in a direction substantially opposite said first direction upon rotary movement of said first reflector into a third rotary position different from said first and second rotary positions, a second reflector carried by said apparatus and having a reflective surface, the reflective surface of said second reflector being located along the path of the light beam a greater distance from said light source than the first reflector so that when said first reflector lies in said second rotary position, the second reflector reflects said light beam in substantially a like direction as said first direction.

22. Apparatus according to claim 21 wherein the reflective surfaces of said first reflector are planar in shape.

* * * * *